United States Patent
Vuille et al.

(10) Patent No.: US 10,346,830 B2
(45) Date of Patent: Jul. 9, 2019

(54) PORTABLE OBJECT COMPRISING A NEAR-FIELD COMMUNICATION DEVICE

(71) Applicant: The Swatch Group Research and Development Ltd, Marin (CH)

(72) Inventors: Pierry Vuille, Les Emibois (CH); Jean-Claude Martin, Montmollin (CH); Michel Willemin, Preles (CH); Thierry Scordilis, Cormondreche (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 15/814,920

(22) Filed: Nov. 16, 2017

(65) Prior Publication Data

US 2018/0189770 A1 Jul. 5, 2018

(30) Foreign Application Priority Data

Dec. 29, 2016 (EP) .................................... 16207336

(51) Int. Cl.
*G06Q 20/32* (2012.01)
*G06K 19/073* (2006.01)
(Continued)

(52) U.S. Cl.
CPC ......... *G06Q 20/3278* (2013.01); *G04G 21/04* (2013.01); *G04R 60/06* (2013.01);
(Continued)

(58) Field of Classification Search
CPC ............... G04R 60/06; G06Q 20/3278; G06K 19/07345; G06K 19/07381;
(Continued)

(56) References Cited

U.S. PATENT DOCUMENTS 3,742,699 A * 7/1973 Bergey ................... G04C 3/002
368/225
3,759,031 A * 9/1973 McCullough .......... G04C 3/004
368/204

(Continued)

FOREIGN PATENT DOCUMENTS

EP        1 876 556 A1   1/2008
WO   WO 2011/067543 A1   6/2011

OTHER PUBLICATIONS

European Search Report dated Jul. 10, 2017 in European application 16207336.5, filed on Dec. 29, 2016(with English Translation of Categories of Cited Documents).

*Primary Examiner* — Devan A Sandiford
(74) *Attorney, Agent, or Firm* — Oblon, McClelland, Maier & Neustadt, L.L.P.

(57) ABSTRACT

A portable object includes a near-field communication device. The communication device includes an electronic chip provided with two terminals connected to an electrical circuit including an antenna and a filter. The communication device is provided to receive and transmit at a defined frequency corresponding to the resonance frequency of the electrical circuit. The portable object includes a control element which is able to be displaced between two predefined positions, i.e. an active position in which the communication device is activated and a passive position in which the communication device is deactivated. The electrical circuit includes, furthermore, a bypass branch provided with a mechanical switch which is able to switch between an open state and a closed state in response to a displacement of the control element from one to the other of its predefined positions causing a modification in the resonance frequency of the electrical circuit.

16 Claims, 4 Drawing Sheets

US 10,346,830 B2
Page 2

(51) Int. Cl.
  *G04G 21/04* (2013.01)
  *G06K 19/077* (2006.01)
  *H04W 4/80* (2018.01)
  *G04R 60/06* (2013.01)
  *G06Q 20/34* (2012.01)
  *H01Q 1/22* (2006.01)
  *H04B 1/3827* (2015.01)
  *H04B 5/00* (2006.01)
  *H04B 5/02* (2006.01)
  *G04R 20/26* (2013.01)

(52) U.S. Cl.
  CPC . *G06K 19/07345* (2013.01); *G06K 19/07762* (2013.01); *G06Q 20/3224* (2013.01); *G06Q 20/352* (2013.01); *H01Q 1/2208* (2013.01); *H04B 1/385* (2013.01); *H04B 5/0025* (2013.01); *H04B 5/02* (2013.01); *H04W 4/80* (2018.02); *G04R 20/26* (2013.01)

(58) Field of Classification Search
  CPC ......... G06K 19/0739; G06K 19/07309; G04G 21/08; H04W 4/80; H04B 5/0031; H04B 5/02; H04B 5/00; H04B 5/0025; H04B 1/385; H04B 2001/3861; H01Q 1/2208
  See application file for complete search history.

(56) References Cited

U.S. PATENT DOCUMENTS

| | | | | |
|---|---|---|---|---|
| 3,782,102 A | * | 1/1974 | Bergey | G04C 3/004 368/226 |
| 3,789,601 A | * | 2/1974 | Bergey | G04G 5/04 368/239 |
| 3,800,525 A | * | 4/1974 | Bergey | G04B 27/00 368/239 |
| 3,817,021 A | * | 6/1974 | Bergey | G04C 3/004 368/239 |
| 3,987,616 A | * | 10/1976 | Castegnier | G04G 21/08 368/159 |
| 6,025,780 A | * | 2/2000 | Bowers | G06K 19/0701 340/572.3 |
| 6,070,803 A | * | 6/2000 | Stobbe | G01S 13/753 235/384 |
| 6,181,248 B1 | * | 1/2001 | Fockens | G06K 19/07 340/572.3 |
| 6,556,222 B1 | * | 4/2003 | Narayanaswami | G04G 9/0064 368/295 |
| 6,685,096 B1 | * | 2/2004 | Degrauwe | G06K 19/0716 235/375 |
| 7,762,471 B2 | * | 7/2010 | Tanner | G06K 19/0723 235/375 |
| 9,342,777 B2 | * | 5/2016 | Piersol | G06K 19/07381 |
| 9,685,814 B1 | * | 6/2017 | Moyer | H02J 7/025 |
| 9,813,041 B1 | * | 11/2017 | Ritter | H03H 7/38 |
| 9,892,715 B2 | * | 2/2018 | Komulainen | G04G 17/045 |
| 10,042,457 B2 | * | 8/2018 | Kim | G06F 3/0416 |
| 10,116,279 B2 | * | 10/2018 | Ritter | H01F 38/14 |
| 2002/0107054 A1 | * | 8/2002 | Fujisawa | G04G 21/04 455/573 |
| 2002/0140546 A1 | * | 10/2002 | Tuttle | G06K 19/0716 340/10.1 |
| 2003/0132301 A1 | * | 7/2003 | Selker | G06K 19/0716 235/487 |
| 2004/0145453 A1 | * | 7/2004 | Tuttle | G06K 19/0716 340/10.1 |
| 2007/0109101 A1 | * | 5/2007 | Colby | G06K 19/0723 340/10.4 |
| 2007/0152828 A1 | * | 7/2007 | Mohalik | G06K 19/07345 340/572.3 |
| 2008/0006696 A1 | * | 1/2008 | Piersol | G06K 19/07381 235/451 |
| 2008/0061151 A1 | * | 3/2008 | Phillips | G06K 19/07345 235/492 |
| 2009/0277964 A1 | * | 11/2009 | Schroder | G06K 19/0726 235/492 |
| 2010/0026468 A1 | * | 2/2010 | Nyalamadugu | G06K 19/07345 340/10.51 |
| 2010/0302012 A1 | * | 12/2010 | Roesner | G06K 7/0008 340/10.5 |
| 2012/0149335 A1 | * | 6/2012 | Wuidart | G06K 19/07345 455/411 |
| 2012/0149443 A1 | * | 6/2012 | Wuidart | G06K 19/0716 455/572 |
| 2012/0241524 A1 | * | 9/2012 | Blot | G06K 7/10128 235/492 |
| 2013/0234835 A1 | * | 9/2013 | Piersol | G06K 19/07381 340/10.5 |
| 2015/0187153 A1 | * | 7/2015 | Davis | G07C 9/00111 340/5.52 |
| 2015/0244179 A1 | * | 8/2015 | Ritter | H02J 5/005 307/104 |
| 2015/0348007 A1 | * | 12/2015 | Khan | G06Q 20/382 705/44 |
| 2015/0348009 A1 | * | 12/2015 | Brown | G06Q 20/3227 705/16 |
| 2015/0365139 A1 | * | 12/2015 | Moon | H04B 5/02 455/41.1 |
| 2016/0063232 A1 | * | 3/2016 | Seol | G06F 3/03547 726/19 |
| 2016/0192716 A1 | * | 7/2016 | Lee | G06F 3/015 2/422 |
| 2016/0203467 A1 | * | 7/2016 | Khan | G06Q 20/382 705/39 |
| 2016/0371516 A1 | * | 12/2016 | Debates | G06K 19/07345 |
| 2016/0371517 A1 | * | 12/2016 | Debates | G06K 19/07309 |
| 2017/0076193 A1 | * | 3/2017 | Piersol | G06K 19/07381 |
| 2017/0357833 A1 | * | 12/2017 | DeBates | G06K 19/07345 |
| 2018/0190455 A1 | * | 7/2018 | Vuille | G06K 19/07345 |

\* cited by examiner

PORTABLE OBJECT COMPRISING A NEAR-FIELD COMMUNICATION DEVICE

This application claims priority from European Patent Application No. 16207336.5 filed on Dec. 29, 2016, the entire disclosure of which is hereby incorporated herein by reference.

TECHNICAL FIELD

The present invention relates to the field of microtechnology. It concerns, more particularly, a portable object comprising a near-field communication device.

PRIOR ART

It is known to produce portable objects incorporating near-field communication means, for example using a radiofrequency tag. These connection means are composed of an electronic chip, or integrated circuit, connected electrically to an antenna. Most of the time, these devices do not require an autonomous electrical supply and are intended to communicate automatically with a reader as soon as they approach one. The electromagnetic field of the reader generates an induced current in the antenna which supplies the chip and makes it possible for it to emit, in turn, a signal via the antenna.

At present, such devices are found in chip cards which make it possible to effect contactless payments at terminals provided for this purpose. Likewise, patent applications EP 603 721, EP 974 878, CH 690 525 or CH 704 583 are known, which describe watches comprising near-field communication means in which the antennae are concealed at various places in the watch, such as the dial, the middle, the bezel, the glass seal or the glass. Other configurations provide for housing the antenna in the base, the movement or even the strap. Integration of these contactless communication devices in a watch allows numerous applications such as producing information-, identification-, locking-, access control- or payment operations.

However, these automatic communication devices have high vulnerability with respect to ill-intentioned third parties who could, by approaching a transmitter-receiver, recover, without the knowledge of their owners, confidential information or could carry out bank transfers to their own advantage. Various approaches have been developed for securing near-field communication devices. Payment cards are thus able to be placed in screened cases which act like a Faraday cage and prevent establishment of any communication. Patent application US 2016/0188925 describes a method for activating or deactivating a radiofrequency tag which has an electronic switch using a suitable auxiliary reader. The electronic unlocking operation can prove to be tedious and not particularly practical since it requires dealing with an object other than the one via which the communication is established. In addition, it presents a security flaw because the near-field communication device remains vulnerable between the moment when it is activated and that when communication is established. The various security methods known are unsuited to some portable objects such as a wristwatch, are not particularly practical and do not make it possible totally to eliminate hacking risks.

SUMMARY OF THE INVENTION

The object of the present invention is to propose a means for securing a near-field communication device integrated in a portable object which is easy to use and safer than the solutions of the prior art.

More precisely, the invention relates to a portable object comprising a near-field communication device. The communication device comprises an electronic chip provided with two terminals connected to an electrical circuit comprising an antenna and a filter. The communication device is provided in order to receive and transmit at a defined frequency corresponding to the resonance frequency of the electrical circuit. In an original manner, the portable object comprises a control element which is able to be displaced between two predefined positions, i.e. an active position in which the communication device is activated and a passive position in which the communication device is deactivated. The electrical circuit comprises, furthermore, a bypass branch provided with a mechanical switch which is able to switch between an open state and a closed state in response to a displacement of the control element from one to the other of its predefined positions causing a modification in the resonance frequency of the electrical circuit.

This arrangement makes it possible to secure a near-field communication device integrated into a portable object whilst simplifying the operations required for this security.

According to an advantageous variant of the invention, the electrical circuit comprises a bridge carrying a capacitor in parallel with the antenna.

According to another advantageous variant of the invention, the antenna and the bridge are connected to the terminals of the electronic chip.

According to another advantageous variant of the invention, the bypass branch is connected to the terminals of the electronic chip.

According to another advantageous variant of the invention, the bridge comprises a second component, mounted in series with the capacitor, and the bypass branch is connected between the two components of the bridge and on one terminal of the electronic chip.

According to another advantageous variant of the invention, the second component is a capacitor or an inductor.

According to another advantageous variant of the invention, the bypass branch comprises a component mounted in series with the switch, the component being a capacitor, an inductor or a resistor.

According to another advantageous variant of the invention, an inductor is mounted between one terminal of the electronic chip and the capacitor, and the bypass branch is mounted parallel to the inductor.

According to another advantageous variant of the invention, the mechanical switch is a Reed switch and the portable object comprises a permanent magnet which is mobile relative to the Reed switch and able to modify the state of the Reed switch in response to a displacement of the control element.

According to another advantageous variant of the invention, the portable object comprises a security switch provided to change state simultaneously with the Reed switch in the presence of an external magnetic field.

According to an advantageous variant of the invention, the portable object comprises an elastic restoring means provided to return the control element automatically from the active position to the passive position.

According to another advantageous variant of the invention, the portable object is a watch.

According to another advantageous variant of the invention, the watch comprises a pivoting bezel which is the control element.

According to another advantageous variant of the invention, the watch comprises a crown or a push button which is the control element.

According to another advantageous variant of the invention, the portable object is a chip card.

BRIEF DESCRIPTION OF THE FIGURES

Other details of the invention will appear more clearly upon reading the description which follows, given with reference to the annexed drawings in which.

DETAILED DESCRIPTION

Figure 1:
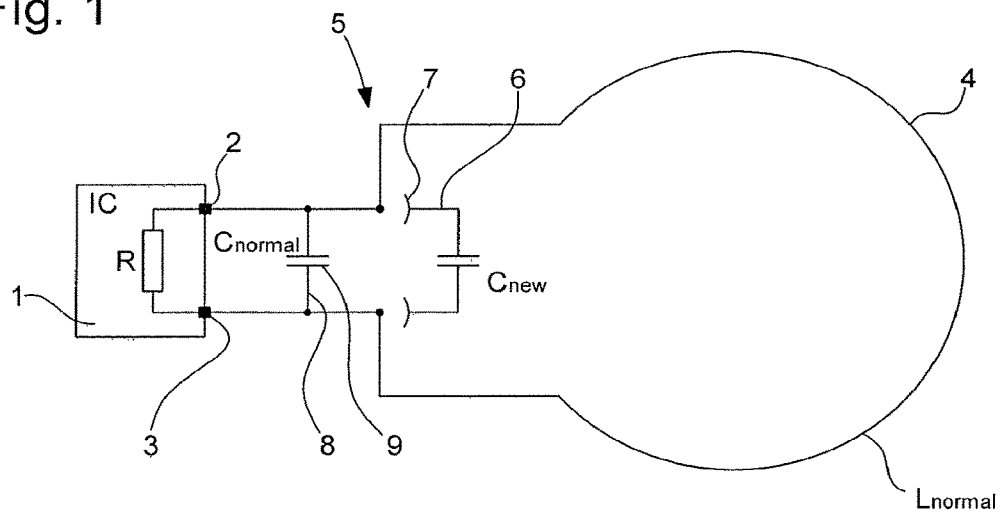
FIGS. 1 to 7 represent various basic diagrams of a communication device of a portable object according to the invention.

FIGS. 1 to 7 represent basic diagrams of the secured near-field communication device which the invention proposes to integrate in portable objects. The communication device comprises an electronic chip 1 provided with two terminals 2, 3 connected to an electrical circuit comprising an antenna 4 and a filter 5, typically a bandpass filter. The near-field communication device is designed to receive and transmit at a defined frequency corresponding to the resonance frequency of the electrical circuit which is likewise the functioning frequency of the reader with which the portable object is intended to communicate. The resonance frequency of the antenna is adapted in order to have better performances (gain) in the band of useful frequencies, and thus to make it possible to receive and transmit in a controlled manner and according to the current RFID standards. The electrical circuit comprises a bypass branch 6 provided with a switch 7 which is able to switch between an open state and a closed state. The switch 7 is controlled by displacement of a control element which the portable object comprises. The control element is able to be displaced between two predefined positions, i.e. an active position in which the communication device is activated and a passive position in which the communication device is deactivated. Displacement of the control element from one to the other of its predefined positions causes switching of the switch 7 and modifies the resonance frequency of the electrical circuit and therefore its ability to communicate with a target reader.

In all the presented examples, the filter comprises a bridge 8 mounted in parallel with the antenna 4. It is also possible that this bridge is mounted in series, and that the other components are likewise placed in a dual manner in order to obtain similar effects, without departing from the scope of the invention. Only the cases with a bridge in parallel will be dealt with, by way of example, in the rest of the description.

Figure 2:
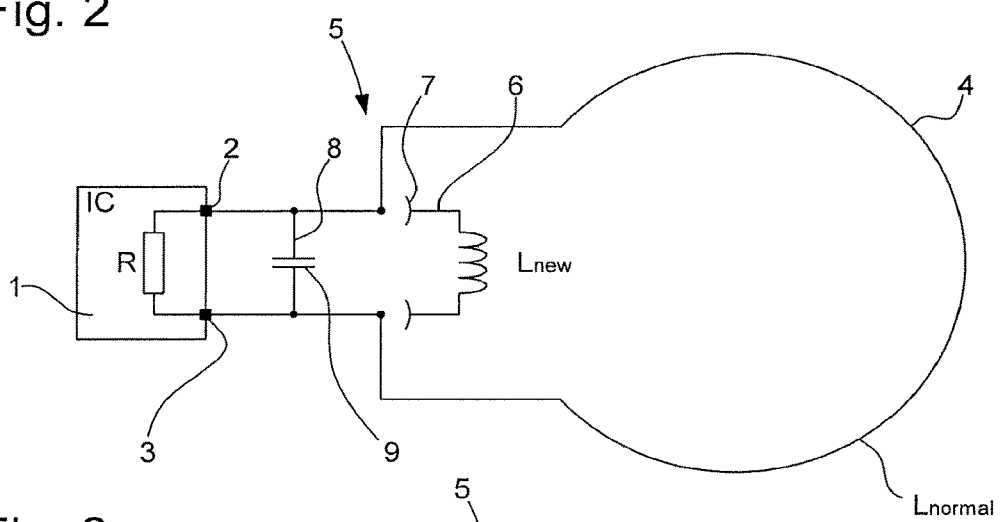
Figure 3:
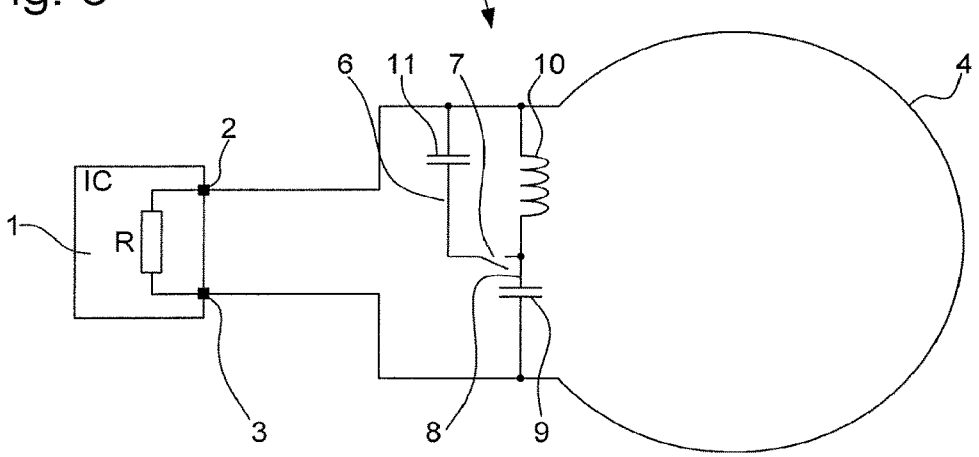
Figure 4:
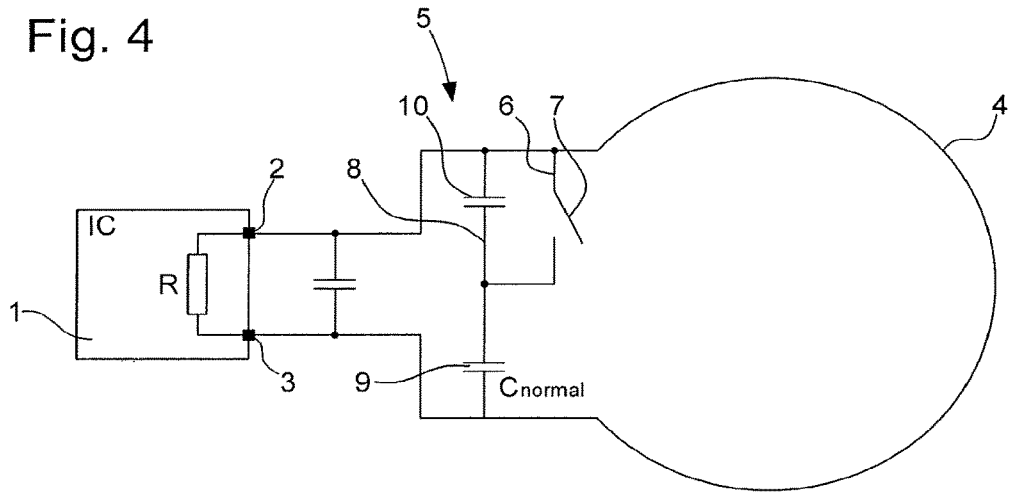
Figure 5:
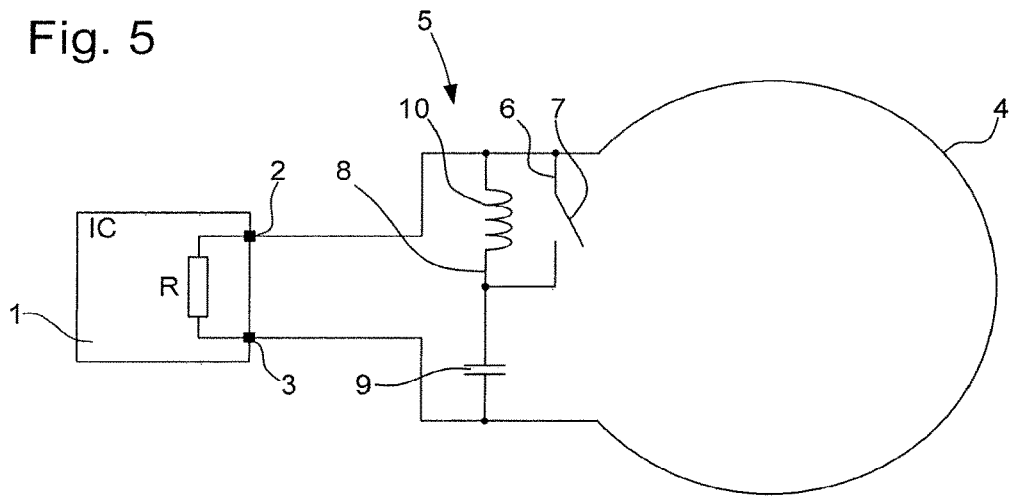
Figure 6:
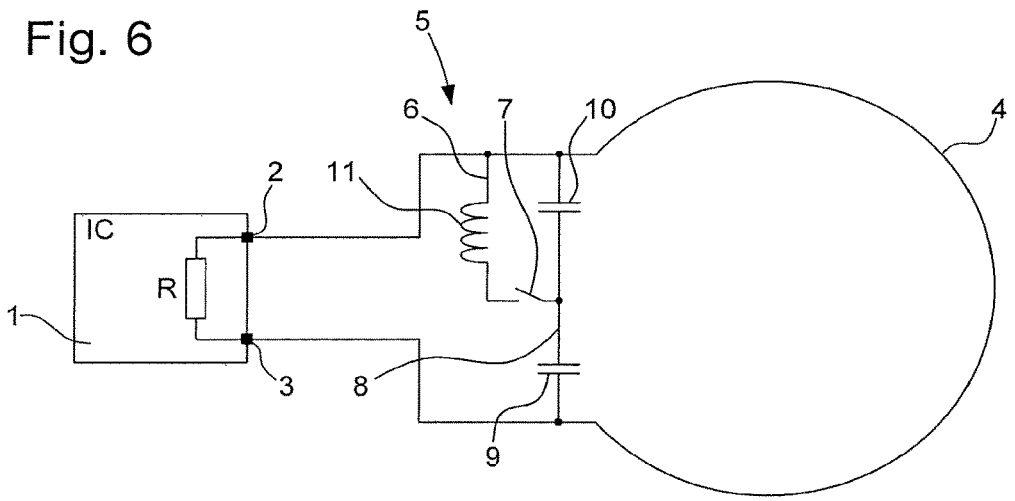

In the examples of FIGS. 1 and 2, the bridge comprises only one capacitor 9, the antenna 4 and the capacitor 9 being connected to the terminals of the electronic chip 1. The bypass branch 6 is likewise connected to the terminals 2, 3 of the electronic chip 1, if the switch 7 is in the closed position.

In the examples of FIGS. 3 to 6, the bridge comprises a second component 10 in addition to the capacitor 9 which can in particular be an inductor or a second capacitor. In this case, the bypass branch 6 is connected in parallel to the second component 10, on one side to a terminal 2 of the electronic chip 1 and on the other between the two components of the bridge 8.

The bypass branch 6 can likewise comprise a component 11 mounted in series with the switch 7, this component 11 being able to be a capacitor, an inductor or a resistor.

Figure 7:
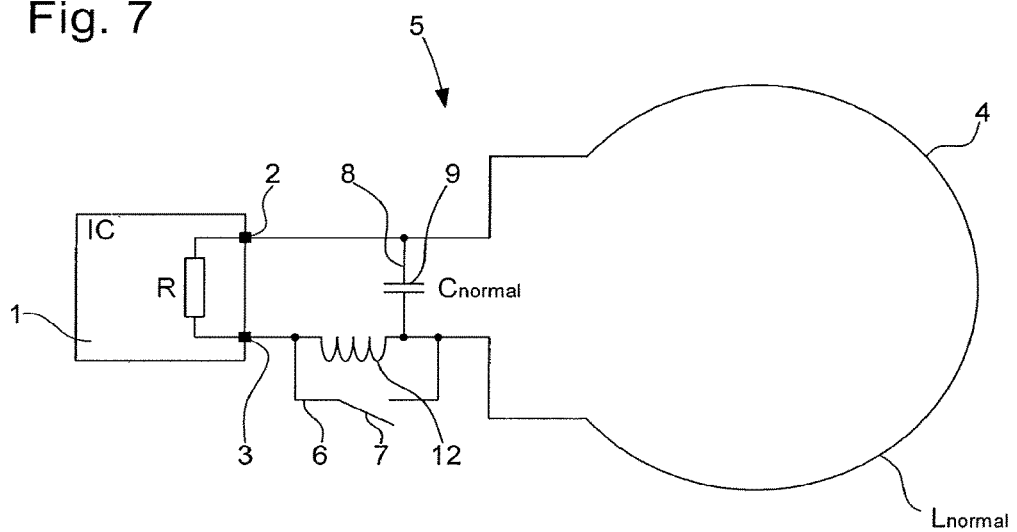

In the example presented in FIG. 7, an inductor 12 is mounted between one terminal 3 of the electronic chip 1 and the capacitor 9 and the bypass branch 6 is mounted parallel to the inductor 12.

The person skilled in the art will be able to create a large number of variants from the examples proposed by combining together the various proposed alternatives.

Figure 8:
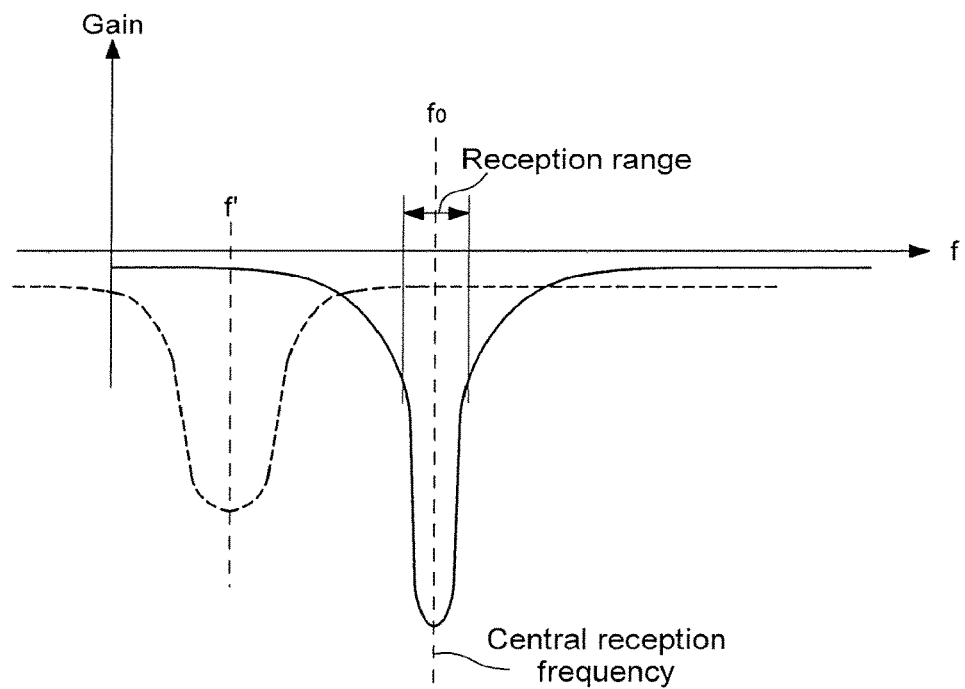
FIG. 8 represents a diagram of the gain of the antenna, i.e. its performance, as a function of the frequency of a communication device according to the invention.

The diagram of FIG. 8 represents the gain of the antenna of the communication device as a function of the frequency in the case of a circuit with a bandpass filter. The central reception frequency of the bandwidth is the resonance frequency $f_0$ of the electrical circuit. The emission frequency of the reader is situated in the bandwidth of the circuit. Outside this receiving range, the signal is too attenuated and the communication device can no longer function. In the case of an LC circuit comprising a capacitor and a coil, the resonance frequency is given by the formula:

$$f_0 = 1/2\pi\sqrt{LC}$$

The modified circuit has a new resonance frequency f' which is sufficiently removed from $f_0$ for a signal emitted in the frequency range of the RFID device to be no longer detected, thus deactivating the communication device.

Figure 9:
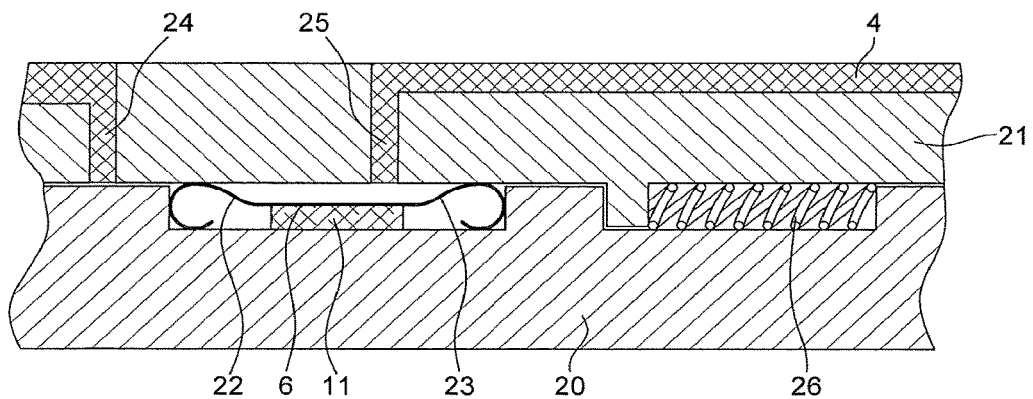
FIGS. 9 and 10 represent a view in section of the bypass branch and of a switch, respectively in open and closed positions.
Figure 10:
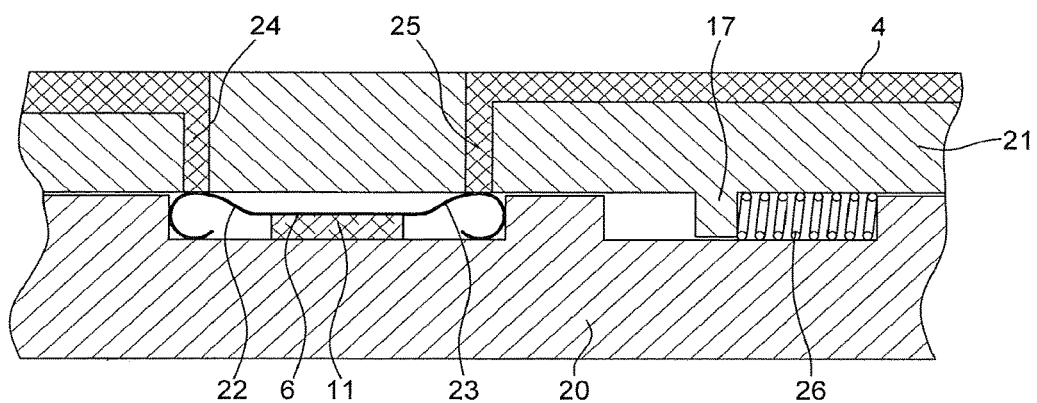

FIGS. 9 and 10 represent a section of a detail of a portable object according to the invention, in this case a watch, where the case 20 can be discerned. A bezel 21, mounted pivotably relative to the case 20, comprises a near-field communication device, such as those represented schematically in FIGS. 1 to 7 and comprising an antenna 4, an electrical circuit and an electronic chip. Flexible conductive blades 22, 23 housed in the case 20 are provided to come into contact with feet 24, 25 of the electrical circuit when the bezel 21, which here is the control element, is in the active position represented in FIG. 10. The flexible blades 22, 23 form a bypass branch 6 which can possibly comprise a supplementary component 11, in particular a capacitor, an inductor or a resistor. When the control element is in the passive position represented in FIG. 9, the bypass branch 6 is connected to the electrical circuit via the feet 24, 25 which has the effect of modifying the resonance frequency thereof and of making the device inactive. The portable object likewise comprises an elastic restoring means 26 provided in order to return automatically the control element into the passive position thereof and thus to secure the device.

The embodiment of a switch of FIGS. 9 and 10 is only one non-limiting example. The person skilled in the art will be able to adapt other devices to produce this function. In particular, the control element can be a push button or even the control crown. In a configuration of interest, the galvanic switch described previously can be replaced by a magnetic switch with a flexible blade of the Reed switch type. In this case, the portable object likewise comprises a permanent magnet which is mobile relative to the Reed switch 26, the relative displacement of the Reed switch and of the magnet being caused by the displacement of the control element. As previously, the assembly is provided in order that the displacement of the control element, between its predefined positions, modifies the state of the Reed switch.

In a non-represented embodiment variant, the portable object comprises a main Reed switch and also a supplementary security switch intended to guard against the risk of a fraudulent connection using a reader and a magnet placed by an ill-intentioned third party near the portable object. This security magnet is likewise a Reed switch. In contrast to the main Reed switch, the security switch is not linked to a permanent magnet because it is not intended to change state during normal functioning but solely in the case of attack.

The security switch can, for example, be mounted in series with the main Reed switch. The security switch is, in this case, a switch of the NC type, normally closed, i.e. it is closed in the absence of a magnetic field and it switches over into the open position under the effect of a magnetic field. The main Reed switch is of the NO type, normally open, and functions inversely to the former. In the case of attack using a magnet, the security switch and the main switch switch simultaneously under the effect of the external magnetic field so that the communication device remains inactive. For preference, the main Reed switch and the security switch are disposed as close as possible ensuring that the displacement of the permanent magnet, controlling the main switch, is without effect on the security switch.

The person skilled in the art will be able to produce many variations from the presented embodiments without departing from the scope of the claims. The passive position of the control element can, for example, just as well correspond to an open state of the switch as to a closed state.

The portable objects according to the invention offer great facility in use and better security than those provided with electronic switches of the prior art, the change of state of which must be controlled in advance from an external electronic apparatus, for example from a smartphone. It is possible easily to adapt this secured near-field communication device on any type of portable object, such as for example a chip card.

Advantageously, the security device proposed by the invention makes it possible to reduce fraudulent communication risks because the device can be activated when the portable object is already situated in the vicinity and under the magnetic influence of the reader with which it is intended to communicate so that the communication is established momentarily with the target reader as soon as the control element is displaced into the active position. Furthermore, automatic return of the control element into its passive position immediately secures the device as soon as the desired operation has been effected so that the portable object is still situated in the range of the magnetic field of the target reader.

Furthermore, the mechanical locking means proposed by the invention gives the user control of the security of the near-field communication device and gives him confidence in the use of this technology which he has lacked until now.

What is claimed is:

1. A portable object, which is a watch, comprising:
   a near-field communication device, the communication device comprising an electronic chip provided with two terminals connected to an electrical circuit comprising an antenna and a filter, the communication device being provided in order to receive and transmit at a defined frequency corresponding to a resonance frequency of the electrical circuit,
   wherein the portable object comprises a control element which is displaceable between two predefined positions, including an active position in which the communication device is activated and a passive position in which the communication device is deactivated,
   wherein the electrical circuit comprises a bypass branch provided with a switch which is switchable between an open state and a closed state in response to a displacement of the control element from one to the other of the predefined positions of the control element, causing a modification in the resonance frequency of the electrical circuit,
   wherein the portable object comprises a pivoting bezel which is the control element,
   wherein the electrical circuit comprises a bridge in parallel with the antenna and carrying a capacitor, and
   wherein the bridge and the bypass branch are separate components.

2. The portable object according to claim 1, wherein the antenna and the bridge are connected to the terminals of the electronic chip.

3. The portable object according to claim 1, wherein the bypass branch is connected to the terminals of the electronic chip.

4. The portable object according to claim 1, wherein the bridge comprises a second component, mounted in series with the capacitor, and wherein the bypass branch is mounted in parallel to the second component by being connected on one side to one terminal of the electronic chip and on the other between the two components of the bridge.

5. The portable object according to claim 4, wherein the second component is a capacitor or an inductor.

6. The portable object according to claim 1, wherein the bypass branch comprises a component mounted in series with the switch, the component being a capacitor, an inductor or a resistor.

7. The portable object according to claim 1, wherein an inductor is mounted between one terminal of the electronic chip and the capacitor, and wherein the bypass branch is mounted parallel to the inductor.

8. The portable object according to claim 1, wherein the switch is a Reed switch, and wherein the portable object comprises a permanent magnet which is mobile relative to the Reed switch and is to modify a state of the Reed switch in response to a displacement of the control element.

9. The portable object according to claim 8, wherein the portable object comprises a security switch provided to change state simultaneously with the Reed switch in a presence of an external magnetic field.

10. The portable object according to claim 1, wherein the portable object comprises a spring provided to return the control element automatically from the active position to the passive position.

11. A portable object, which is a watch, comprising:
   a near-field communication device, the communication device comprising an electronic chip provided with two terminals connected to an electrical circuit comprising an antenna and a filter, the communication device being provided in order to receive and transmit at a defined frequency corresponding to a resonance frequency of the electrical circuit,
   wherein the portable object comprises a control element which is displaceable between two predefined positions, including an active position in which the communication device is activated and a passive position in which the communication device is deactivated,
   wherein the electrical circuit comprises a bypass branch provided with a switch which is switchable between an open state and a closed state in response to a displacement of the control element from one to the other of the predefined positions of the control element, causing a modification in the resonance frequency of the electrical circuit,
   wherein the portable object comprises a watch crown or a push button which is the control element, wherein the electrical circuit comprises a bridge in parallel with the antenna and carrying a capacitor, and wherein the bridge and the bypass branch are separate components.

12. The portable object according to claim 11, wherein the bypass branch is connected to the terminals of the electronic chip.

13. The portable object according to claim 11, wherein the bypass branch comprises a component mounted in series with the switch, the component being a capacitor, an inductor or a resistor.

14. The portable object according to claim 11, wherein the switch is a Reed switch, and wherein the portable object comprises a permanent magnet which is mobile relative to the Reed switch and is to modify a state of the Reed switch in response to a displacement of the control element.

15. The portable object according to claim 11, wherein the portable object comprises a spring provided to return the control element automatically from the active position to the passive position.

16. A portable object, which is a watch, comprising:
a near-field communication device, the communication device comprising an electronic chip provided with two terminals connected to an electrical circuit comprising an antenna and a filter, the communication device being provided in order to receive and transmit at a defined frequency corresponding to a resonance frequency of the electrical circuit, wherein the portable object comprises a control element which is displaceable between two predefined positions, including an active position in which the communication device is activated and a passive position in which the communication device is deactivated, wherein the electrical circuit comprises a bypass branch provided with a switch which is switchable between an open state and a closed state in response to a displacement of the control element from one to the other of the predefined positions of the control element, causing a modification in the resonance frequency of the electrical circuit, wherein the portable object comprises a pivoting bezel which is the control element, wherein the electrical circuit comprises a bridge in parallel with the antenna and carrying a capacitor, and wherein the bridge comprises a second component, mounted in series with the capacitor, and wherein the bypass branch is mounted in parallel to the second component by being connected on one side to one terminal of the electronic chip and on the other between the two components of the bridge.

* * * * *